Feb. 14, 1950   F. W. SCHULTZ   2,497,141
SYNCHRONOUS MOTOR
Filed May 28, 1949
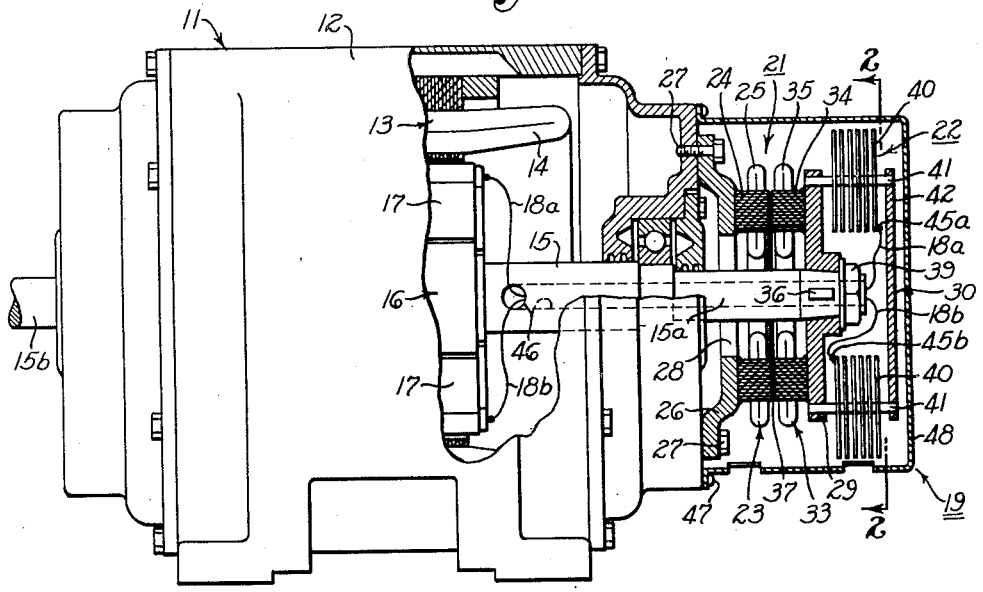
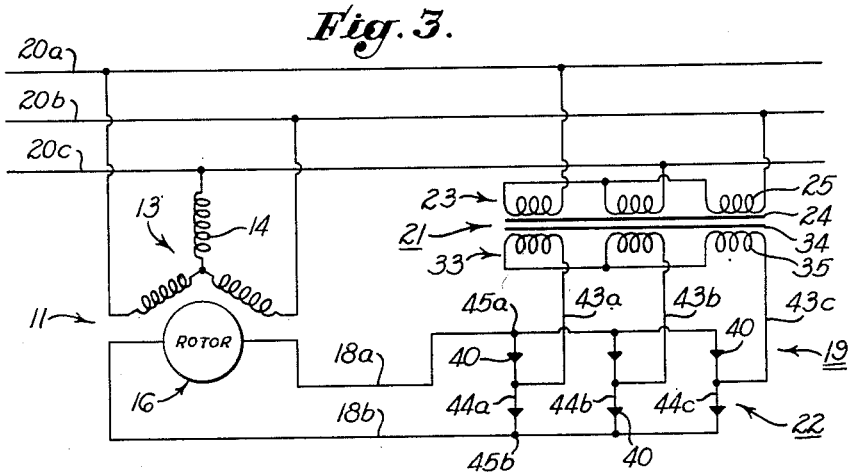
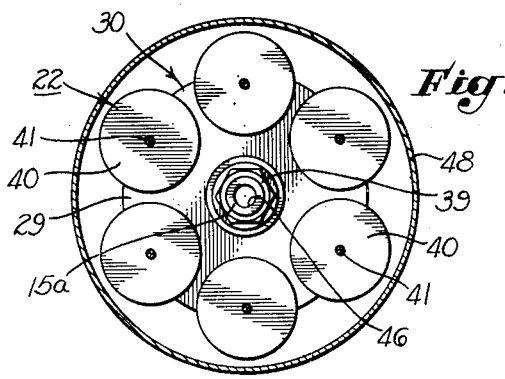
INVENTOR.
FREDERIC W. SCHULTZ
BY HIS ATTORNEYS.
HARRIS, KIECH, FOSTER & HARRIS
BY

Patented Feb. 14, 1950

2,497,141

UNITED STATES PATENT OFFICE 2,497,141

SYNCHRONOUS MOTOR

Frederic W. Schultz, Los Angeles, Calif.

Application May 28, 1949, Serial No. 96,077

1 Claim. (Cl. 172—120)

My invention relates to alternating current motors of the synchronous type; that is, motors which are stable when operating at a synchronous speed corresponding to the frequency of the energizing current, and, in particular, to a unidirectional current field excitation system for motors of this type. By a "unidirectional current," I mean one which has a predominant flow in one direction only; that is, flows on the average more in one direction than in the opposite direction.

A common method of providing field excitation for synchronous motors is by the use of a direct current generator employing a commutator and brushes. Such a generator is frequently mounted on the synchronous motor shaft or may be independently operated. In either event, the unidirectional current requisite for field excitation of the synchronous motor is brought to the rotor by means of brushes resting on collector rings.

It is the primary object of the invention to provide a novel excitation system for synchronous motors in which there are eliminated the commutator and brushes of the direct current generator now used as standard equipment for furnishing excitation current, as well as the rotor collector rings with their brushes by means of which the excitation current is conventionally supplied to the synchronous motor itself. In this regard, the synchronous motor with its unidirectional excitation means of my invention may be used in locations where sparking commutators and collector rings would constitute a hazard, such as in flour mills, chemical plants, or other locations where potentially explosive atmospheres may occasionally exist.

Another object of my invention is to supply a synchronous motor with field excitation current obtained by rectification of an alternating current which is inductively coupled to the input of a rotatable metallic rectifier unit so as to require no direct electrical input connection between the alternating current source and the rectifier. In this connection, it is a further object to provide a frequency multiplying means whereby the alternating current input to the metallic rectifier unit may be of a higher frequency than that of the line current.

An additional object of my invention is to provide unidirectional current supply means such, for example, as a rectifier unit mounted on the motor shaft for rotation in unison with the rotor of a synchronous motor, the output terminals of such rectifier being directly connected by conductors to the rotor through the shaft to supply excitation current to the rotor upon rotation of the shaft, rotor and rectifier.

It is another object of my invention to provide for improved cooling of metallic type rectifiers employed to supply unidirectional excitation current for a synchronous motor by revolving the rectifiers on the free end of the synchronous motor shaft to create a forced air draft on the rectifier plates or discs, thus permitting the use of smaller rectifiers than could be used with a stationary unit.

A further object of my invention is to provide a synchronous motor with its excitation means which is more compact and lighter in weight than the conventional motor and excitation means of like power.

The above and other objects and advantages of my invention will be apparent to those skilled in the art from the following description of my exemplary embodiment.

Referring to the drawing:

Fig. 1 is a diagrammatic view partially in section showing the excitation system of my invention as employed with a conventional synchronous motor;

Fig. 2 is a vertical section taken on line 2—2 of Fig. 1; and,

Fig. 3 is a simplified wiring diagram of a synchronous motor and excitation system of my invention.

Referring to the drawing, which is for illustrative purposes only, the numeral 11 indicates a polyphase synchronous motor of conventional design having a frame 12 in which is housed a fixed armature or stator 13 having a three-phase star wound stator winding 14 energized by the main line current drawn through conductors 20a, 20b, and 20c, as best shown in Fig. 3. A motor shaft 15, having a hollow free end portion 15a and a driving end portion 15b, carries a field or rotor 16 having a number of salient poles 17 and a squirrel cage winding in the pole faces (not shown) to provide for self starting. Excitation current is directly supplied the pole windings of the rotor 16 by conductors 18a and 18b which pass through the hollow free end portion 15a of the shaft 15 to the exciter of my invention, indicated generally at 19.

The exciter 19 includes an induction means 21 and a rectifying means 22, each of which will be more specifically described as follows:

The induction means 21 comprises a transformer which also operates as an axial air gap frequency changer, having a fixed primary 23, and a rotatable secondary 33. The primary 23 has a ring-shaped core 24 retaining in radial slots therein (not shown) an annular multi-polar primary winding 25, supplied with main line current brought by the conductors 20a, 20b, and 20c. The primary core 24 is secured by welding or other suitable means to the outer face of an annular mounting bracket 26 which, in turn, is affixed by bolts 27 to the motor frame 12. The mounting bracket 26 has a central aperture 28 which is coaxial with the shaft 15 and concentric with the core 24 and primary winding 25. The periphery of the free end portion of the shaft 15 is spaced from the bracket 26, the primary core 24 and the primary winding 25 so as to permit relative rotation of said shaft 15 with respect to said members.

The secondary 33 of the induction means 21, which is affixed to an inner plate 29 of a rotating carriage 30 by welding or other suitable means, has a ring-shaped core 34 and an annular secondary winding 35 similar respectively to the primary core 24 and primary winding 25. The inner plate 29 of the carriage 30 is affixed by key means 36 to the shaft 15 in such position as to provide a small axial air gap 37 between the fixed primary core 24 and the rotatable secondary core 34, and retained by a nut 39 which engages threads (not shown) at the extremity of the hollow free end portion 15a of the shaft 15.

The rectifying means 22 comprises a plurality of metallic rectifier units 40, such, for example, as selenium, copper oxide, or copper sulphate rectifiers, which are uniformly spaced circumferentially of the carriage 30 and mounted on spacer bars 41 which rigidly connect the inner plate 29 to an outer plate 42 of the carriage 30.

In the exemplary embodiment illustrated in the drawings, I have shown six such metallic rectifier units 40 uniformly spaced circumferentially of the carriage 30 in series parallel electrical connection, it being understood that an almost unlimited number of circuit arrangements of such rectifier units may be successfully employed with various numbers of such rectifier units, the particular arrangement described being for illustrative purposes only.

Alternating current input to the rectifier units 40 from the secondary winding 35 is carried by conductors 43a, 43b, and 43c to conductors 44a, 44b, and 44c, respectively, each of the latter conductors connecting in series a pair of rectifier units 40 as best illustrated in circuit diagram Fig. 3. Unidirectional current output from the rectifier units 40 is carried to the synchronous motor rotor 16 from a pair of output terminals 45a and 45b by means of the respective conductors 18a and 18b; all of such series connected pairs of rectifier units 40 being connected in parallel to said conductors. For illustrative purposes, I have shown the conductors 18a and 18b passing through the hollow free end portion 15a of the shaft 15 from the tip thereof to the rotor 16 via a shaft aperture 46. However, direct electrical connection from the output terminals 45a and 45b may be made to the rotor 16 in various other ways as, for example, by use of the shaft 15 as one of the conductors or by running one or both of the conductors externally of the shaft embedded in an axial slot therein.

The entire exciter 19 is cased in a vented housing 48 removably secured to the motor frame 12 by bolts 47 to provide protection for the mechanically moving parts.

In the operation of a synchronous motor having incorporated therein or associated therewith, the exciter system of my invention, a polyphase alternating current is applied through the main line conductors 20a, 20b, and 20c to the stator winding 14 of the motor 11 and to the transformer primary winding 25. Upon energization of the stator winding 14, the motor 11 starts as a conventional induction motor, due to the presence of the squirrel cage winding (not shown) on the rotor 16. Concomitantly with the energization of the stator winding 14, the main line current energizes the primary 23 of the induction means 21 and before the synchronous motor rotor 16 has commenced its movement, a polyphase alternating current of the frequency of the main line is induced from the primary 23 into the secondary 33. The subsequent rotation of the rotor 16 causes the revolution of the carriage 30 which carries the secondary 33 as well as the rectifier units 40. As the secondary 33 rotates at increasing speed in unison with the rotor on the carriage, an increasing voltage and frequency are induced by the primary 23 into the secondary 33, which voltage, in turn, is fed to the metallic rectifier units 40 via conductors 43a, 43b, and 43c and conductors 44a, 44b, and 44c.

Unidirectional current output potential from the metallic rectifiers 40 is led from output terminals 45a and 45b through conductors 18a and 18b directly to the rotor 16; the conductors 18a and 18b revolving about the axis of the shaft 15. As the speed of the rotor 16 continues to increase and approaches synchronous speed, the unidirectional current potential applied to the rotor from the rectifier quickly builds up toward full value and causes the rotor to pull into step and synchronize at the frequency of the main line current.

The primary winding 25 is connected to the main line current source in such sequence that the direction of rotation of the magnetic field set up in the primary 23 is opposite to the direction of rotation of the magnetic field produced by the stator winding 14. At synchronous speed, therefore, current of a multiple frequency of the line frequency is induced from the primary 23 into the secondary 33 and applied to the rectifier units 40. I prefer to provide a rotating secondary 33 having the same number of poles as the synchronous motor rotor 16, in which event, I double the line frequency. In such preferred embodiment, for example, on the basis of a conventional sixty cycle line frequency, the induced frequency in the secondary would, at synchronous speed, be one hundred twenty cycles, which is an ideal input frequency for metallic rectifier units 40 of the selenium type. Thus, the induction means 21, having a fixed primary 23 and rotatable secondary 33, not only provides alternating current input to the rectifying means 22 without the use of conventional brushes, but also serves as a frequency multiplier to reduce ripple in the direct current output from the rectifier units 40, since an increase in the frequency of the input current to said rectifier units necessarily results in a smoothing out of the unidirectional current output therefrom.

Due to the rotation of the rectifier units 40 on the carriage 30, the former are cooled by a forced air draft which eliminates the need for any other cooling means and enables the use of much smaller rectifiers than would otherwise be possible, which is another advantage of my invention.

Thus, it may be seen that I have provided a synchronous motor with an exciter system which eliminates the conventional direct current generator and direct current input means to the field of the motor. The exciter system of my invention is simple in construction and operation, and less bulky than the conventional excitation means. It may be used as an attachment with synchronous motors of conventional design already installed and operating, or may be built into new synchronous motors as an integral part thereof.

While that embodiment of my invention hereinbefore illustrated and described performs the objects and provides the advantages previously stated, it may be embodied in various other forms and modifications and it is to be understood, therefore, as not restricted to the specific form hereinbefore set forth but as including variations and modifications thereof coming within the scope of the claim which follows.

I claim as my invention:

In combination with a polyphase synchronous motor, said motor having an enclosing frame, an armature structure of magnetic material rigidly supported in said frame, said structure having a bore therein, a polyphase armature winding on said armature structure, means connecting said armature winding to a polyphase source of electric current, a shaft supported by and turning in bearings in said frame and having an end portion extending outside said frame, a field structure of magnetic material carried on said shaft within said armature bore, and a unidirectional-current winding on said field structure, the parts previously enumerated in this claim being well known and forming a combination found in any conventional polyphase synchronous motor: an exciting means for said unidirectional-current winding comprising a primary magnetic means fixed to said frame outside said frame; a primary polyphase winding carried on said primary magnetic means; a secondary magnetic means concentrically mounted on said end portion of said shaft and rotating therewith, said secondary magnetic means being so placed as to form a magnetic circuit with said primary magnetic means; a secondary polyphase winding carried on said secondary magnetic means; a polyphase rectifier carried on and rotating with said end portion of the shaft and electrical conductors by which current from each phase of said secondary winding is carried through one phase of said rectifier and thence through the shaft of the motor to said winding on said field structure and thence through said shaft back through the rectifier to said secondary winding.

FREDERIC W. SCHULTZ.

REFERENCES CITED

The following references are of record in the file of this patent:

UNITED STATES PATENTS

| Number | Name | Date |
|---|---|---|
| 2,204,916 | Shotter | June 18, 1940 |
| 2,414,287 | Crever | Jan. 14, 1947 |

FOREIGN PATENTS

| Number | Country | Date |
|---|---|---|
| 302,931 | Great Britain | Dec. 5, 1929 |